United States Patent [19]
Wilkins

[11] Patent Number: 5,316,366
[45] Date of Patent: May 31, 1994

[54] CAMPER SHELL MOUNTING RAIL

[76] Inventor: Larry K. Wilkins, 6098 W. 10550 North, Highland, Utah 84003

[21] Appl. No.: 629

[22] Filed: Jan. 5, 1993

[51] Int. Cl.$^5$ .............................. B60P 7/02
[52] U.S. Cl. ................................ 296/167; 296/100
[58] Field of Search .................. 296/167, 164, 35.1, 296/100

[56] References Cited

U.S. PATENT DOCUMENTS

| | | | |
|---|---|---|---|
| 4,627,655 | 12/1986 | Collins | 296/167 |
| 4,828,315 | 5/1989 | Muirhead | 296/100 X |
| 4,941,705 | 7/1990 | Wurtz | 296/100 |

FOREIGN PATENT DOCUMENTS 519499  7/1927  Fed. Rep. of Germany ...... 296/100

Primary Examiner—David M. Mitchell
Assistant Examiner—Gary C. Hoge
Attorney, Agent, or Firm—Thorpe, North & Western

[57] ABSTRACT

A camper shell mounting rail is formed from two pieces, one of which retains one side of the lower terminus of the side-wall of the camper shell, and the other piece retains the other side. Fasteners such as rivets or screws enter the mounting rail from the bottom and secure the two pieces together, while, at the same time, clamping the sidewall of the camper shell between the two pieces.

10 Claims, 2 Drawing Sheets

CAMPER SHELL MOUNTING RAIL

BACKGROUND

This invention relates a mounting rail for mounting camper shells to the beds of vehicles. More specifically, the invention provides a convenient and aesthetically favorable mounting rail for attaching camper shells to the tops of sidewalls of pickup truck beds, using a limited amount of hardware, without violating the structural integrity of the camper shell wall, and having concealed fasteners.

Camper shells have long been utilized to convert the harsh environment which is often found in the back of pickup trucks and the like, to a relatively less harsh environment. The manner of attaching the camper shell to the bed of the truck or the like, has an important bearing on whether unwanted environmental factors are effectively eliminated from the interior chamber formed by the vehicle and the camper shell. Additionally, numerous stress forces caused by such factors as air movement, vibration, resonance, vehicular movement, etc., mandate an attachment which effectively secures the camper shell to the tops of the sidewalls of pickup trucks and the like. Highway safety further dictates that all camper shells on moving vehicles be securely fastened. The high cost of vehicles, which often serve as status symbols, creates a desire to secure the camper shell in an aesthetically pleasing manner. This may be accomplished by eliminating visible hardware and surplus lines and surfaces.

Multiple lines and surfaces also present a collection point for soil, wax, or other substances not desired to be accumulated on the exterior of a vehicle or camper shell. Multiple lines can cause snagging, deflection, or wear upon cleaning equipment such as cloths, buffing equipment or other provisions to clean or care for an automobile.

A number of systems are currently in use to secure camper shells to the tops of the beds of pickup trucks. One system utilizes a mounting rail with a horizontal member which may be fastened to the top of the sidewall of the pickup truck, and a vertical member which is screwed or otherwise fastened to one or more corresponding vertical members of the shell. This system has several disadvantages. First, the vertical member if the camper shell is weakened at the critical attachment area by the damage made by the screws protruding through it. This violation of the camper shell can create points at which stress fractures can form and eventually lead to the total failure of the attachment. Second, the head of the screw or other fastener is either exposed to the external environment, or must be covered with trim. Third, the protruding point and/or threads of the screw or other fastener are either exposed to the internal environment of the camper shell or must be covered by yet another component; usually an inverted "U" channel. The screw or fastener protrudes through one wall of the inverted "U" channel, and the remaining walls conceal the protruding fastener. Fourth, the external portion of the fasteners and/or their cover are exposed to tampering, vandalism, or an increased risk of damage.

Another system uses a construction involving a horizontal rail, an outside corner, and an inner tube. The inner tube is simultaneously fastened to the rail and the outside corner, with the rim of the shell clamped between the tube and the outside corner. This system utilizes three independent components which must be aligned and fastened simultaneously. This presents the hazard that one or more components will come out of alignment during the fastening process, thus creating an unsightly error and necessitating that one or more components be discarded as waste, and the process repeated.

For the foregoing reasons, there is a need in the prior art for a mounting rail for mounting camper shells to a the tops of sidewalls of pickup trucks and the like, which reduces the number of components, conceals fasteners, protects the structural integrity of the camper shell wall, and is simple and easy to install.

SUMMARY

It is an object of the invention to provide a mounting rail to mount camper shells to the tops of the sidewalls of pickup trucks and the like, with a limited number of components.

It is another object of the invention to provide a system to fasten camper shells to the tops of the sidewalls of pickup trucks and the like, with concealed fasteners.

It is an additional object of the present invention to provide a mounting rail to mount camper shells to the tops of the sidewalls of pickup trucks and the like, which is easy to assemble due to a limited number of components.

It is yet another object of the present invention to provide a mounting rail to mount camper shells to the tops of the sidewalls of pickup trucks and the like, with an exterior surface which is aesthetically pleasing.

It is still another object of the present invention to provide a mounting rail to mount camper shells to the tops of the sidewalls of pickup trucks and the like, in a secure manner.

It is a further object of the present invention to provide a mounting rail to mount camper shells to the tops of the sidewalls of pickup trucks and the like, which is less susceptible to tampering or damage.

It is also and object of the present invention to provide a mounting rail to mount camper shells to the tops of the sidewalls of pickup trucks and the like, without violating the structural integrity of the camper shell wall.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

The above and other objects of the invention are realized in a specific illustrative embodiment of a mounting rail for securing a camper shell to the tops of sidewalls of a pickup truck bed and the like, where the camper shell has a downwardly projecting lower rim. The mounting rail has a one-piece base element formed with an elongate strip for placement on the top of a truck bed sidewall. The base element includes a lip extending upwardly from an outer side of the strip to enable placement of the lower rim of the camper shell onto the strip against the lip, and the lip prevents the rim from moving laterally off from the strip. The mounting rail also has an elongate clamping means for placement on the strip and against the lower rim of the camper shell to hold the rim in position between the clamping means and lip. The mounting rail also has fastener means for securing the clamping means to the strip to urge the clamping means against the lower rim of the camper shell.

In accordance with another aspect of the invention, the clamping means is an elongate tube which has a downwardly projecting foot which extends substantially the length of the tube from one side thereof to contact the strip when the tube is placed thereon to cause the tube to pivot toward and against the lower rim of the camper shell when the fastener means secures the clamping means to the strip.

In accordance with still another aspect of the invention, the strip has a recessed area on its underside to receive the head of the fastening means when installed.

BRIEF DESCRIPTION OF THE DRAWINGS

The above and other objects of the invention will become apparent from a consideration of the following detailed description presented in connection with the accompanying drawings in which.

DETAILED DESCRIPTION

Figure 1:
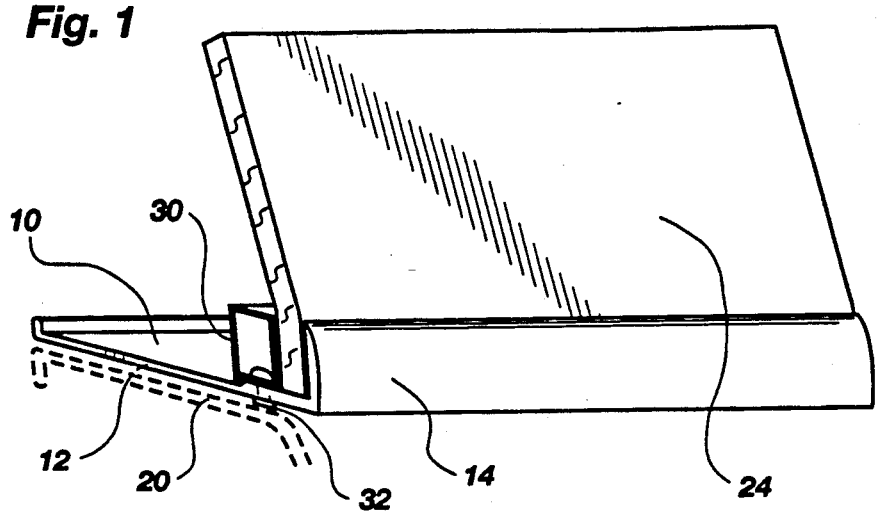
FIG. 1 is perspective view of one embodiment of a mounting rail made in accordance with the principles of the present invention.
Figure 2:
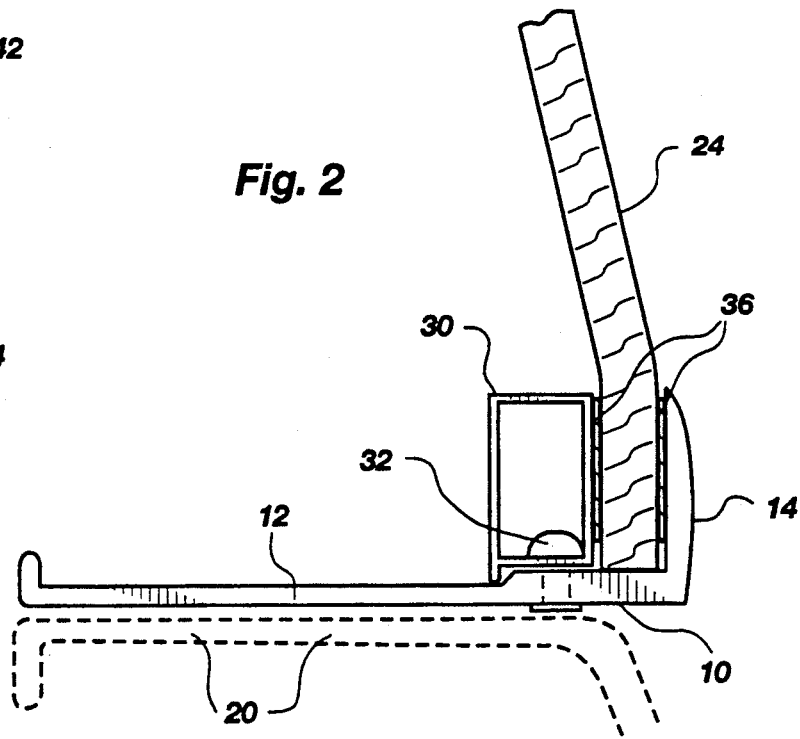
FIG. 2 is an end, cross-sectional view of the mounting rail in FIG. 1.

Referring to FIGS. 1 and 2, there is shown one illustrative embodiment of a mounting rail for mounting camper shells to beds of vehicles. The mounting rail is comprised of a base element 10 which is formed with an elongate strip 12 and a upwardly extending lip 14. The base element 10 is formed of a material of sufficient strength to accomplish the structural requirements herein described. The base element 10 is formed of extruded aluminum or similar material. The elongate strip 12 of the base element 10 is fashioned to fit on the top of a truck bed sidewall 20. The elongate strip 12 can be fastened to the top of a truck bed sidewall 20 in any way presently known or to be discovered. The upwardly extending lip 14 of the base element 10 rises in a substantially perpendicular direction from one side of the elongate strip 12. The upwardly extending lip 14 is adjacent and lateral from the downwardly projecting lower rim 24 of a camper shell and is fashioned so as to retain the downwardly projecting lower rim 24 of a camper shell from movement due to outward lateral forces.

The mounting rail for mounting camper shells to beds of vehicles is further comprised of a clamp 30. The clamp 30 is placed on the base element 10 inward and adjacent to the lower rim 24 of a camper shell. The clamp 30 is fastened to the base element 10 in a position adjacent and inward from the lower rim 24 of a camper shell by means of a rivet 32 or other fastening means. The clamp 30 supports the lower rim 24 of a camper shell against movement due to inward lateral forces. Space between the upwardly extending lip 14 and the outer side of the lower rim 24 of a camper shell, and also space between the clamp 30 and inner side of the lower rim 24 of a camper shell, is filled and bound with an adhesive 36.

When the rivet 32 or other fastening means is fastened to the clamp 30, and the base element 10, the upper head of the rivet 32 is hidden from view by the structure of the clamp 30.

Figure 3A:
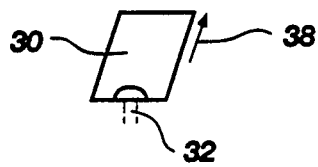
FIGS. 3A, 3B, and 3C are fragmented, end, cross-sectional views of three embodiments of clamping means of a mounting rail made in accordance with the principles of the present invention.
Figure 3B:
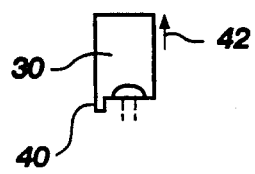
Figure 3C:
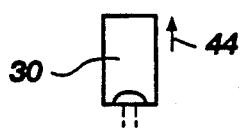

Referring to FIGS. 3A, 3B, and 3C, there are shown other illustrative embodiments of the clamp 30 of FIGS. 1 and 2. In FIG. 3A the clamp 30 is a parallelogram (exaggerated) in shape so that when the rivet 32 of FIGS. 1 and 2 fastens the clamp 30 to the base element 10, edge 38 of clamp 30 is forced snugly against the inner edge of the lower rim 24 of a camper shell, tightly securing the lower rim 24 of a camper shell between the clamp 30 and the upwardly extending lip 14 of the base element 10.

In FIG. 3B the clamp 30 is roughly rectangular or square in shape and has a foot 40 extending downward from the inward lower corner. The foot 40 of the clamp 30 deflects the pressures created in fastening the clamp 30 to the base element 10 so that edge 42 of clamp 30 is forced snugly against the inner edge of the lower rim 24 of a camper shell, tightly securing the lower rim 24 between the clamp 30 and the upwardly extending lip 14.

In FIG. 3C the clamp 30 is roughly rectangular or square in shape. Pressures, in this embodiment, are created between edge 44 of the clamp 30, the lower rim 24 of a camper shell, and the upwardly extending lip 14 of the base element 10, by ether matching right angles meeting against an adhesive 36 placed between the clamp 30 and the lower rim 24 of a camper shell; or by forming the base element 10 with an acute angle between the upwardly extending lip 14 and the remainder of the base element 10, and the lower rim 24 of a camper shell with a complementary acute angle of the upwardly extending lip 14, thereby creating pressures due to the difference in the angles.

Figure 4:
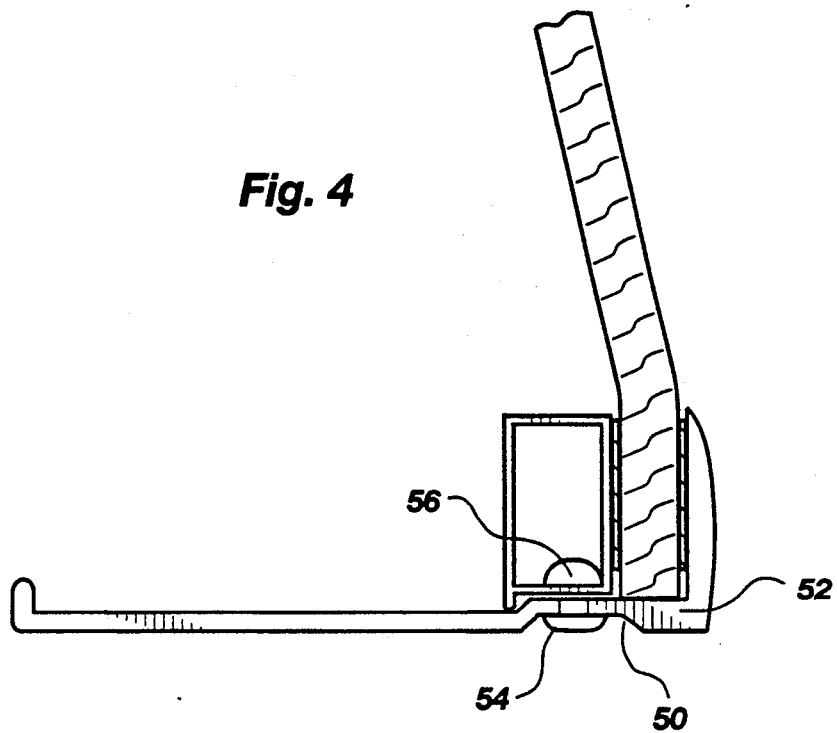
FIG. 4 is an end, cross-sectional view of another embodiment of a mounting rail made in accordance with the principles of the present invention.

Referring to FIG. 4, there is shown another illustrative embodiment of a mounting rail for mounting camper shells to beds of vehicles. In this embodiment a recess 50 is formed in the underside of the base element 52. The recess 50 receives in it the head 54 of a fastener 56, thereby maintaining a flush lower surface on the base element 52 for mounting on a pickup bed.

Figure 5:
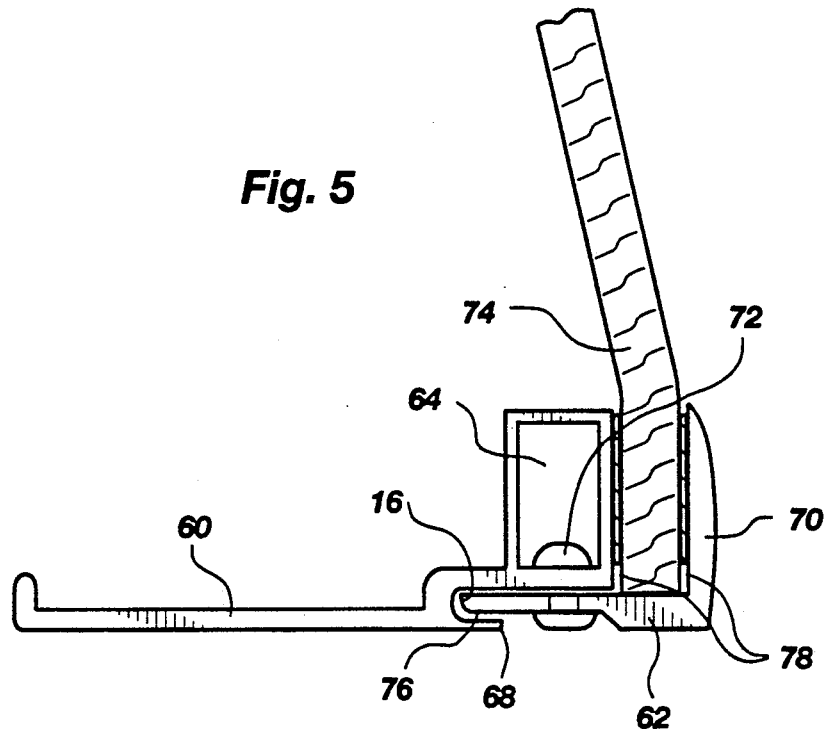
FIG. 5 is an end, cross-sectional view of a still another embodiment of a mounting rail made in accordance with the principles of the present invention.

Referring to FIG. 5, there is shown yet another illustrative embodiment of a mounting rail for mounting camper shells to beds of vehicles. In this embodiment a mounting rail is formed from an elongate holder 60 and a bracket 62. The elongate holder 60 and the bracket 62 are formed of the same materials as the mounting rail described hereinabove. The elongate holder 60 has a rectangular lip 64 formed on its outboard edge, and a well 66 formed in an area below the rectangular lip 64.

The bracket 62 is formed with a horizontal strip 68 and a vertical strip 70. The inboard edge 76 of the horizontal strip 68 is received into the well 66 of the elongate holder 60 to secure the two pieces together against vertical pressures. The bracket 62 is further secured to the elongate holder 60 with a rivet 72 or other fastener as herein above described. The rivet 72 or other fastener extends from a point below the bracket 62, through the elongate holder 60, and terminates inside the rectangular lip 64 of the elongate holder 60. The downwardly projecting lower rim 74 of a camper shell is received between the vertical strip 70 of the bracket 60, and the outboard edge of the rectangular lip 64. The lower rim 24 of a camper shell is retained between the vertical strip 70 of the bracket 62, and the outboard edge of the rectangular lip 64 of the elongate holder 60 by means of adhesive 78 therebetween.

It is to be understood that the above-described arrangements are only illustrative of an application of the present invention. Numerous modifications and alternative arrangements may be devised by those skilled in the art without departing from the spirit and scope of the present invention and the appended claims are intended to cover such modifications and arrangements.

What is claimed is:

1. A mounting rail for securing a camper shell to the tops of side walls of a pickup truck bed, where the camper shell has a downwardly projecting lower rim, said rail including a one-piece base element formed with an elongate strip for placement on the top of the truck bed sidewall, said base element including a lip extending upwardly from an outer side of the strip to enable placement of the lower rim of the camper shell onto the strip, against the lip so that the lip prevents the rim from moving laterally off from the strip, an elongate clamping means for placement on the strip and against the lower rim of the camper shell to hold the rim in position between the clamping means and lip, pivot means for causing the clamping means to pivot toward and against the lower rim of the camper shell when the clamping means is urged downwardly against the strip, and fastener means for urging the clamping means downwardly against the strip to secure the clamping means thereon.

2. A mounting rail as in claim 1 wherein said clamping means comprises an elongate tube, and wherein said pivot means comprises a downwardly projecting foot from the tube which extends substantially the length of the tube from one side thereof to contact the strip when the tube is placed thereon to cause the tube to pivot toward and against the lower rim of the camper shell when the fastener means secures the clamping means to the strip.

3. A mounting rail as in claim 2 wherein said clamping means comprises an elongate tube of generally rectangular cross-section.

4. A mounting rail as in claim 1 wherein said clamping means comprises an elongate tube of generally parallelogram cross-section.

5. A mounting rail as in claim 1 wherein said base element is formed with a recess on the underside which extends substantially the length of the base element, and wherein said fastener means includes a head which is received in the recess when the fastener means is installed.

6. A mounting rail as in claim 1 further including adhesive disposed between the mounting rail and the downwardly projecting lower rim of the camper shell.

7. A mounting rail for securing a camper shell to the tops of sidewalls of a pickup truck bed, where the camper shell has a downwardly projecting lower rim and a lower terminus, said rail including an elongate holder comprising an elongate strip for placement on the top of a truck bed sidewall, and a lip formed on the outboard edge of the elongate strip to extend upwardly, the lip having an underside, a bracket with a horizontal strip and a vertical strip, said horizontal strip is below the lower terminus of the lower rim of the camper shell and attaches to the elongate holder, said vertical strip is adjacent to the lower rim of the camper shell and holds the bracket against the lip and prevents the lower rim from moving laterally, and fastener means for securing the horizontal strip of the bracket to the underside of the lip thereby forming a trough defined by the lip and the bracket for receiving the lower rim of the camper shell.

8. A mounting rail as in claim 7 wherein said lip comprises an elongate tube.

9. A mounting rail as in claim 7 wherein said elongate holder includes a well formed on the underside thereof, for receiving and retaining the inboard edge of the horizontal strip of the bracket.

10. A mounting rail as in claim 7 further including adhesive disposed between the mounting rail and the downwardly projecting lower rim of the camper shell.

* * * * *